United States Patent
Miura et al.

(10) Patent No.: US 10,122,172 B2
(45) Date of Patent: Nov. 6, 2018

(54) AIR-CONDITIONING CONTROL SYSTEM AND METHOD

(71) Applicant: AZBIL CORPORATION, Chiyoda-ku (JP)

(72) Inventors: Mayumi Miura, Chiyoda-ku (JP); Masato Tanaka, Chiyoda-ku (JP); Kouji Higashijima, Chiyoda-ku (JP); Takashi Koyanagi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 152 days.

(21) Appl. No.: 14/978,360

(22) Filed: Dec. 22, 2015

(65) Prior Publication Data

US 2016/0187019 A1    Jun. 30, 2016

(30) Foreign Application Priority Data

Dec. 24, 2014    (JP) .................................. 2014-259863

(51) Int. Cl.
  *H02J 3/14*    (2006.01)
  *G05F 1/66*    (2006.01)
  *G05B 15/02*   (2006.01)

(52) U.S. Cl.
  CPC ............... *H02J 3/14* (2013.01); *G05B 15/02* (2013.01); *G05F 1/66* (2013.01); *Y02B 70/3225* (2013.01);
  (Continued)

(58) Field of Classification Search
  CPC ......... F24F 11/02; G05B 15/02; G06Q 50/06; H02J 3/14; H02J 2003/143;
  (Continued)

(56) References Cited

U.S. PATENT DOCUMENTS 9,657,979 B2 * 5/2017 Yoshimi .................. F25B 49/02
2010/0217451 A1 * 8/2010 Kouda ..................... G06Q 50/06
  700/291

(Continued)

FOREIGN PATENT DOCUMENTS

JP       10103736 A  *  4/1998
JP    2008-170141 A      7/2008
(Continued)

OTHER PUBLICATIONS

Korean Office Action dated Oct. 12, 2016 in Patent Application No. 10-2015-0181104.

(Continued)

*Primary Examiner* — Crystal J Barnes-Bullock
(74) *Attorney, Agent, or Firm* — Oblon, McClelland, Maier & Neustadt, L.L.P.

(57) ABSTRACT

An air-conditioning control system includes a grouping target apparatus storage unit that stores information about a plurality of air-conditioning apparatuses which are rotation group setting targets; an attribute storage unit that stores an attribute of each of the air-conditioning apparatuses; a group setting rule storage unit that stores a group setting rule for reducing, between the rotation groups, a difference in total power consumption of air-conditioning apparatuses having an identical attribute; a power consumption obtaining unit that obtains information about power consumption values of the air-conditioning apparatuses; a group determination unit that determines rotation groups to which the air-conditioning apparatuses belong in accordance with the power consumption values of the air-conditioning apparatuses and the group setting rule; and a group storage unit that stores grouping information indicating the rotation groups to which the air-conditioning apparatuses belong.

6 Claims, 4 Drawing Sheets

(52) U.S. Cl.
CPC .......... *Y02B 70/3275* (2013.01); *Y04S 20/222* (2013.01); *Y04S 20/244* (2013.01)

(58) Field of Classification Search
CPC ............ Y02B 70/3225; Y02B 70/3275; Y04S 20/222; Y04S 20/244
See application file for complete search history.

(56) References Cited

U.S. PATENT DOCUMENTS

| | | | | |
|---|---|---|---|---|
| 2012/0198253 | A1* | 8/2012 | Kato | G06F 1/20 713/320 |
| 2013/0111492 | A1* | 5/2013 | Nojiri | G06F 1/206 718/104 |
| 2013/0123992 | A1* | 5/2013 | Ishizaka | F24F 3/065 700/277 |
| 2015/0185261 | A1* | 7/2015 | Frader-Thompson | G01D 4/002 702/61 |
| 2015/0303693 | A1* | 10/2015 | Wu | H02J 3/14 307/31 |

FOREIGN PATENT DOCUMENTS

| | | | | |
|---|---|---|---|---|
| JP | 2010-190434 | | 9/2010 | |
| JP | 2013170715 | A * | 9/2013 | |
| JP | 2014-009895 | | 1/2014 | |
| JP | 2014-134299 | | 7/2014 | |
| JP | 2016053442 | A * | 4/2016 | ............. F24F 11/02 |
| KR | 10-2008-0066489 | | 7/2008 | |

OTHER PUBLICATIONS

Japanese Office Action dated Jan. 31, 2018 in Japanese Patent Application No. 2014-259863 (submitting unedited computer generated English translation only).

* cited by examiner

AIR-CONDITIONING CONTROL SYSTEM AND METHOD

CROSS-REFERENCE TO RELATED APPLICATIONS

This application claims priority to Japanese Application No. 2014-259863, filed Dec. 24, 2014, the entire contents of which are incorporated herein by reference.

BACKGROUND OF THE INVENTION

1. Field of the Invention

The present invention relates to fluctuating air-conditioning control for cyclically repeating an operation in which a plurality of rotation groups enter an energy saving mode in turn, and relates specifically to an air-conditioning control system and method for reducing failure events with appropriate grouping.

2. Description of the Related Art

Currently, fluctuating air-conditioning control in which a room temperature setting is cyclically changed or an air-conditioning apparatus is cyclically turned on and off in order to achieve both comfort and energy saving is available. For this fluctuating air-conditioning control, a technique for shifting the phase (timing) of a fluctuation cycle for changing a room temperature setting or the phase of a fluctuation cycle for changing operation of an air-conditioning apparatus in order to restrain peak usage of electric power from occurring in a certain period is proposed (see Japanese Unexamined Patent Application Publication No. 2010-190434). Further, a technique is proposed in which, in a case of operation of shifting a fluctuation cycle, air-conditioning apparatuses having the same room temperature setting or the same power consumption are classified into separate groups and operated (see Japanese Unexamined Patent Application Publication No. 2014-009895).

For example, it is assumed that, for a building, operation group classification is performed for air-conditioning apparatuses K1 to K8 having power consumption values as illustrated in Table 1 in order to shift the phases for starting and stopping the air-conditioning apparatuses K1 to K8.

TABLE 1

| Apparatus | Power Consumption [kW] |
|---|---|
| K1 | 140 |
| K2 | 70 |
| K3 | 70 |
| K4 | 30 |
| K5 | 30 |
| K6 | 20 |
| K7 | 20 |
| K8 | 10 |

When air-conditioning apparatuses having the same power consumption are classified into two groups (in a case of using the technique disclosed in Japanese Unexamined Patent Application Publication No. 2014-009895), air-conditioning apparatuses having the same power consumption are put in separate groups, and two groups illustrated in Table 2 are generated first.

TABLE 2

| Group 1 | Group 2 |
|---|---|
| K2 (Power Consumption: 70 kW) | K3 (Power Consumption: 70 kW) |
| K4 (Power Consumption: 30 kW) | K5 (Power Consumption: 30 kW) |
| K6 (Power Consumption: 20 kW) | K7 (Power Consumption: 20 kW) |

When the remaining air-conditioning apparatuses K8 and K1 are put in separate groups so as to reduce an imbalance in power consumption, the air-conditioning apparatuses are classified into the groups as illustrated in Table 3 or 4.

TABLE 3

| Group 1 | Group 2 |
|---|---|
| K2 (Power Consumption: 70 kW) | K3 (Power Consumption: 70 kW) |
| K4 (Power Consumption: 30 kW) | K5 (Power Consumption: 30 kW) |
| K6 (Power Consumption: 20 kW) | K7 (Power Consumption: 20 kW) |
| K8 (Power Consumption: 10 kW) | K1 (Power Consumption: 140 kW) |

TABLE 4

| Group 1 | Group 2 |
|---|---|
| K2 (Power Consumption: 70 kW) | K3 (Power Consumption: 70 kW) |
| K4 (Power Consumption: 30 kW) | K5 (Power Consumption: 30 kW) |
| K6 (Power Consumption: 20 kW) | K7 (Power Consumption: 20 kW) |
| K1 (Power Consumption: 140 kW) | K8 (Power Consumption: 10 kW) |

In this case, the ratio of the total power consumption of group 1 to that of group 2 is 130 to 260 in the case of grouping illustrated in Table 3 and is 260 to 130 in the case of grouping illustrated in Table 4. When fluctuating air-conditioning control is performed in which the air-conditioning apparatuses in group 1 and those in group 2 are alternately turned on (normal operation) and off (stop), the power consumption during operation changes as illustrated in FIG. 6 in the case of grouping illustrated in Table 4. In the example illustrated in FIG. 6, the power consumption of group 1 is much higher, and it is found that the effect of distribution for restraining peak power consumption from occurring in a certain period is not sufficiently attained.

Accordingly, by taking only air-conditioning apparatuses into consideration, appropriate grouping might not be possible with the related art. Further, an air-conditioning control system is not always constituted by only air-conditioning apparatuses. Therefore, in a case of operation in which the phase of a fluctuation cycle is shifted for only air-conditioning apparatuses, failure events may occur in the air-conditioning control system. Accordingly, there is a demand for further improvement.

SUMMARY OF THE INVENTION

The present invention has been made in order to address the above-described issue, and an object thereof is to provide an air-conditioning control system and method for reducing failure events in a case where fluctuating air-conditioning control is performed.

An aspect of the present invention provides an air-conditioning control system for performing fluctuating air-conditioning control for cyclically repeating an operation in which a plurality of rotation groups enter an energy saving mode in turn, the air-conditioning control system including a grouping target apparatus storage unit, an attribute storage unit, a group setting rule storage unit, a power consumption obtaining unit, a group determination unit, and a group storage unit. The grouping target apparatus storage unit stores in advance information about a plurality of air-conditioning apparatuses which are rotation group setting targets. The attribute storage unit stores in advance an attribute of each of the air-conditioning apparatuses for which the information is stored in the grouping target apparatus storage unit. The group setting rule storage unit stores in advance a group setting rule for reducing, between the rotation groups, a difference in total power consumption of air-conditioning apparatuses having an identical attribute. The power consumption obtaining unit obtains information about power consumption values of the air-conditioning apparatuses for which the information is stored in the grouping target apparatus storage unit. The group determination unit determines rotation groups to which the air-conditioning apparatuses belong in accordance with the power consumption values of the air-conditioning apparatuses obtained by the power consumption obtaining unit and the group setting rule. The group storage unit stores grouping information indicating the rotation groups to which the air-conditioning apparatuses belong.

In one exemplary configuration of the air-conditioning system of the present invention, the group setting rule is a rule that a process of comparing total power consumption values of the rotation groups, each of the total power consumption values of the rotation groups being a total power consumption value of air-conditioning apparatuses classified into each of the rotation groups, with each other for each attribute and classifying an air-conditioning apparatus into a rotation group having the smallest total power consumption value is performed for each attribute until rotation groups of all of the air-conditioning apparatuses that are grouping targets are determined.

In one exemplary configuration of the air-conditioning system of the present invention, the group determination unit performs, for each attribute, a process of determining the rotation groups of the air-conditioning apparatuses by applying the group setting rule to the air-conditioning apparatuses in descending order of required power consumption values of the air-conditioning apparatuses.

In one exemplary configuration of the air-conditioning system of the present invention, in a case where a value of the attribute is denoted by H, a rotation group determined for each attribute value H in accordance with the group setting rule is referred to as an attribute-basis rotation group Rp(H), a rotation group that is finally determined is denoted by Rp, total power consumption of air-conditioning apparatuses included in an attribute-basis rotation group Rp(H) is denoted by Wgp(H), and total power consumption of air-conditioning apparatuses included in a rotation group Rp is denoted by Wgp, the group determination unit further performs, for each attribute value H, a process of classifying an air-conditioning apparatus that is included in an attribute-basis rotation group Rp(H) having the largest total power consumption Wgp(H) among attribute-basis rotation groups Rp(H) for which classification into rotation groups Rp is not completed into a rotation group Rp having the smallest total power consumption Wgp.

In one exemplary configuration of the air-conditioning system of the present invention, the air-conditioning system further includes a control device that gives instructions to the air-conditioning apparatuses for cyclically repeating an operation in which the plurality of rotation groups enter the energy saving mode in turn in accordance with the grouping information stored in the group storage unit.

Further, an aspect of the present invention provides an air-conditioning control method for performing fluctuating air-conditioning control for cyclically repeating an operation in which a plurality of rotation groups enter an energy saving mode in turn, the air-conditioning control method including: a power consumption obtaining step of referring to a grouping target apparatus storage unit that stores in advance information about a plurality of air-conditioning apparatuses which are rotation group setting targets, and obtaining information about power consumption values of the air-conditioning apparatuses for which the information is stored in the grouping target apparatus storage unit; a group determination step of referring to the grouping target apparatus storage unit, an attribute storage unit that stores in advance an attribute of each of the air-conditioning apparatuses, and a group setting rule storage unit that stores in advance a group setting rule for reducing, between the rotation groups, a difference in total power consumption of air-conditioning apparatuses having an identical attribute, and determining rotation groups to which the air-conditioning apparatuses belong in accordance with the power consumption values of the air-conditioning apparatuses obtained in the power consumption obtaining step and the group setting rule; and a recording step of recording, to a group storage unit, grouping information indicating the rotation groups to which the air-conditioning apparatuses belong.

According to the present invention, rotation groups to which air-conditioning apparatuses belong are determined in accordance with the power consumption values of the air-conditioning apparatuses obtained by the power consumption obtaining unit and the group setting rule stored in the group setting rule storage unit to thereby reduce, between the rotation groups, the difference in the total power consumption of air-conditioning apparatuses having the same attribute (heat source apparatus or measurement area). Accordingly, it is possible to reduce failure events caused by an imbalance in power consumption.

In the present invention, with the group setting rule that a process of comparing the total power consumption values of the rotation groups, each of the total power consumption values of the rotation groups being the total power consumption value of air-conditioning apparatuses classified into each of the rotation groups, with each other for each attribute and classifying an air-conditioning apparatus into a rotation group having the smallest total power consumption value is performed for each attribute until rotation groups of all of the air-conditioning apparatuses that are grouping targets are determined, it is possible to implement appropriate grouping.

In the present invention, in a case where the value of the attribute is denoted by H, a rotation group determined for each attribute value H in accordance with the group setting rule is referred to as an attribute-basis rotation group Rp(H), a rotation group that is finally determined is denoted by Rp, the total power consumption of air-conditioning apparatuses included in an attribute-basis rotation group Rp(H) is denoted by Wgp(H), and the total power consumption of air-conditioning apparatuses included in a rotation group Rp is denoted by Wgp, a process of classifying an air-conditioning apparatus that is included in an attribute-basis rotation group Rp(H) having the largest total power consumption Wgp(H) among attribute-basis rotation groups Rp(H) for which classification into rotation groups Rp is not completed into a rotation group Rp having the smallest total power consumption Wgp is performed for each attribute value H. Accordingly, it is possible to increase the possibility of further reducing, between the rotation groups, the difference in the total power consumption in terms of overall power consumption for all attributes.

DESCRIPTION OF THE PREFERRED EMBODIMENTS

Principle of Invention

Figure 1:
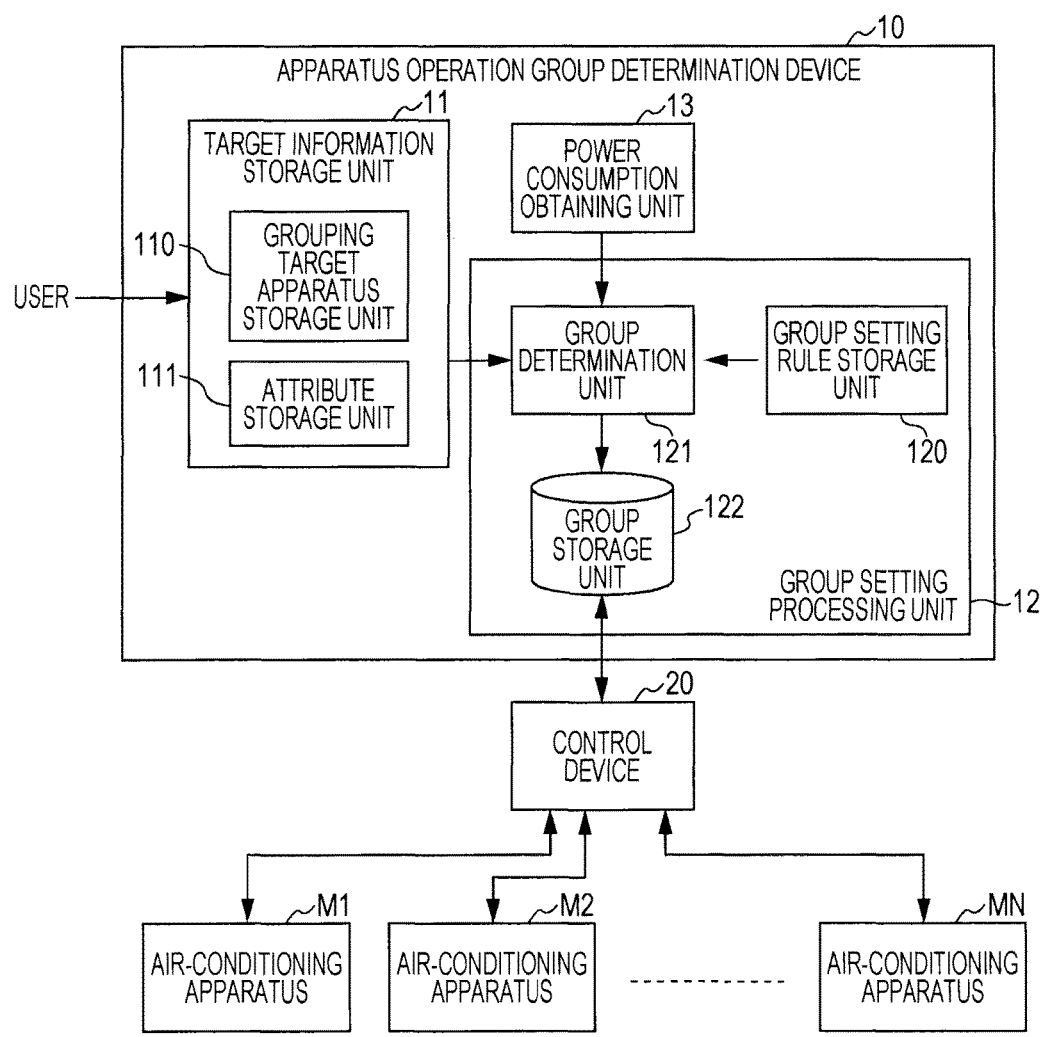
FIG. 1 is a block diagram illustrating a configuration of an air-conditioning control system according to a first embodiment of the present invention.

In an air-conditioning control system, measuring apparatuses and heat source apparatuses connected to air-conditioning apparatuses also often become power consumption units. Therefore, the inventor has focused on a need to further reduce failure events in the power consumption units other than the air-conditioning apparatuses.

The inventor has found that even if air-conditioning apparatuses having the same room temperature setting or the same power consumption are classified into separate groups and the phase of a fluctuation cycle of each group is shifted, a failure event (failure event to be avoided) may occur where a certain heat source apparatus accidentally enters an excessive on/off state and inefficiently starts and stops repeatedly, for example. The inventor has further found that a failure event (failure event to be avoided) may occur where a certain tenant facility, which is a unit for measurement, accidentally enters an excessive on/off state and high peak usage of electric power occurs, resulting in an increase in the electricity price, for example.

Consequently, the inventor has conceived that a group setting operation that reduces the difference in electric power between rotation groups is to be performed for individual attributes (heat source apparatuses or measurement areas) while assuming these failure events. For example, there is an effective rule that air-conditioning apparatuses are rearranged in descending order of their required power consumption values (estimated values of power consumption or the like) for each attribute, and the air-conditioning apparatuses are assigned to a plurality of rotation groups in descending order of the required power consumption values.

First Embodiment

Hereinafter, embodiments of the present invention will be described with reference to the drawings. In this embodiment, in fluctuating air-conditioning control for cyclically repeating an operation in which a plurality of rotation groups (groups for phase shifting) enter an energy saving mode (which is a general term for an operation mode in which an energy saving operation is performed and which also includes an operation of stopping an apparatus) in turn, the rotation groups to which air-conditioning apparatuses belong are set in accordance with a rule described below so as to reduce, between the rotation groups, the difference in the total power consumption of air-conditioning apparatuses having attributes that are targets for smoothing electric power.

An air-conditioning control system according to this embodiment controls air-conditioning apparatuses so that an operation in which determined rotation groups enter an energy saving mode in turn is cyclically repeated. Hereinafter, an apparatus operation group determination device by which the present invention is characterized will be described. To simplify description, it is assumed that there are two groups, namely, group 1 and group 2; however, the air-conditioning control system can be implemented similarly in a case of classification into three or more groups.

FIG. 1 is a block diagram illustrating a configuration of the air-conditioning control system according to this embodiment. The air-conditioning control system includes an apparatus operation group determination device 10, a control device 20, and air-conditioning apparatuses M1 to MN.

The apparatus operation group determination device 10 includes a target information storage unit 11, a group setting processing unit 12, and a power consumption obtaining unit 13. In the target information storage unit 11, information about target air-conditioning apparatuses are registered in advance by a building manager or a control provider.

The group setting processing unit 12 determines and stores rotation groups of the target air-conditioning apparatuses in accordance with the target information registered in the target information storage unit 11 and a group setting rule.

The target information storage unit 11 includes a grouping target apparatus storage unit 110 and an attribute storage unit 111. The group setting processing unit 12 includes a group setting rule storage unit 120, a group determination unit 121, and a group storage unit 122.

In the grouping target apparatus storage unit 110, air-conditioning apparatuses that are rotation group setting targets and information (apparatus addresses for identifying apparatuses, for example) needed for the air-conditioning control system to control the air-conditioning apparatuses are registered in advance by a building manager or a control provider.

In the attribute storage unit 111, an attribute of each of the air-conditioning apparatuses registered in the grouping target apparatus storage unit 110, specifically, an attribute H, which is a target for smoothing electric power, is registered in advance by a building manager or a control provider. In this embodiment, it is assumed that the attribute H, which is a target for smoothing electric power, can have a value of 2 as a maximum value G, and therefore, H is equal to 1 or 2.

The attribute H, which is a target for smoothing electric power, corresponds to a heat source apparatus that supplies a heat medium (hot and chilled water, for example) to the air-conditioning apparatus, a measurement area (a tenant facility, for example) that indicates a unit for which power consumption is measured, or the like. For example, the attribute H of an air-conditioning apparatus that is supplied with a heat medium from a heat source apparatus 1 is equal to 1, and the attribute H of an air-conditioning apparatus that is supplied with a heat medium from a heat source apparatus 2 is equal to 2. The attribute H of an air-conditioning apparatus that belongs to a measurement area 1 is equal to 1, and the attribute H of an air-conditioning apparatus that belongs to a measurement area 2 is equal to 2.

In the group setting rule storage unit 120, a basic rule described in this embodiment is registered in advance as a group setting rule.

The group determination unit 121 determines rotation groups of the target air-conditioning apparatuses in accordance with the target information registered in the target information storage unit 11 and the group setting rule.

The group storage unit 122 stores grouping information indicating rotation groups to which air-conditioning apparatuses belong.

The power consumption obtaining unit 13 obtains information about the power consumption values of the air-conditioning apparatuses registered in the grouping target apparatus storage unit 110.

Figure 2:
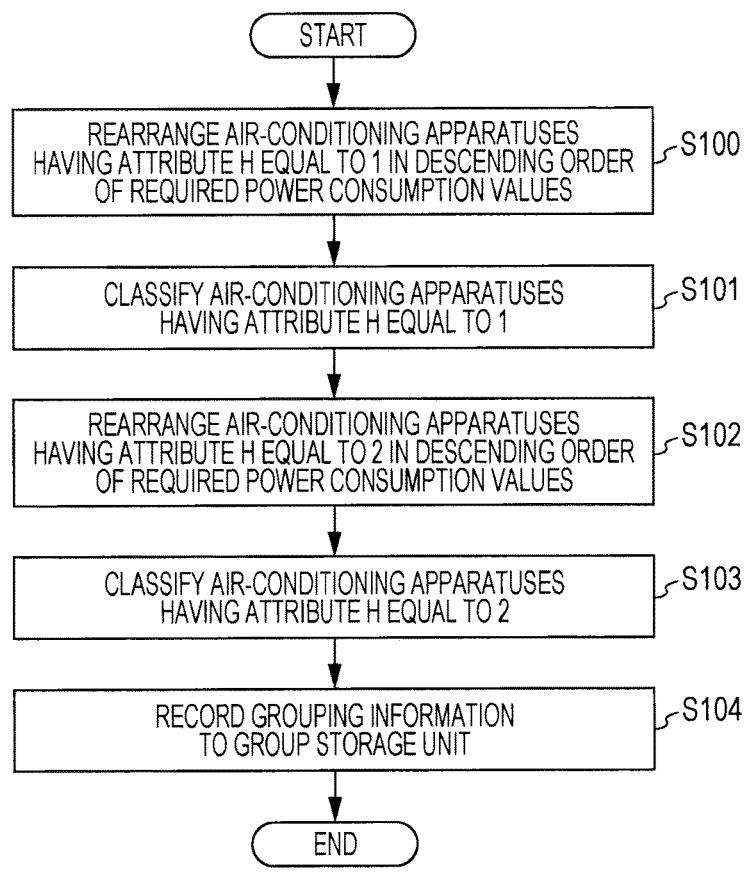
FIG. 2 is a flowchart illustrating an operation of a group determination unit of an apparatus operation group determination device according to the first embodiment of the present invention.

Next, an operation of the group determination unit 121 will be described with reference to FIG. 2. FIG. 2 is a flowchart illustrating an operation of the group determination unit 121.

The basic rule registered in advance in the group setting rule storage unit 120 will be described first.

The basic rule of this embodiment is that a process of comparing the total power consumption values of rotation groups R, each of the total power consumption values of the rotation groups R being the total power consumption value of air-conditioning apparatuses M classified into each of the rotation groups R, with each other for each attribute and classifying an air-conditioning apparatus M into a rotation group R having the smallest total power consumption value is repeated until rotation groups R of all air-conditioning apparatuses M that are grouping targets are determined. Here, the magnitude relationship between total power consumption values need not be precisely determined, and the order of total power consumption values that differ within a margin of error may be interchanged in accordance with a target level of electric power smoothing.

In a case where the total power consumption values of rotation groups R are equal to each other, an air-conditioning apparatus M may be put in any of the rotation groups R. In this case, according to this embodiment, an air-conditioning apparatus M is classified into a rotation group R having the smallest number among a plurality of rotation groups R having the smallest total power consumption.

The power consumption of an air-conditioning apparatus mentioned in this embodiment corresponds to a required power consumption value and may be a power consumption value based on the rated power or power consumption characteristics of the air-conditioning apparatus, an actual value of past power consumption, an estimated value of power consumption, or an electric current value that can be converted into an electric power value.

The power consumption obtaining unit 13 determines the rated power or an actual value of past power consumption of each air-conditioning apparatus stored in advance to be the power consumption of the air-conditioning apparatus as is.

In a case of estimating power consumption, the power consumption obtaining unit 13 estimates the power consumption of each air-conditioning apparatus from an actual value of past power consumption of the air-conditioning apparatus and weather forecast information (weather, outside air temperature, humidity, and so on) of the day on which grouping and air-conditioning operation are performed, on the basis of a relationship between the actual value of past power consumption of the air-conditioning apparatus and weather information (weather, outside air temperature, humidity, and so on), which have been stored in the power consumption obtaining unit 13. The weather forecast information can be obtained from an external weather forecast system not illustrated.

In this embodiment, as illustrated in Table 5, it is assumed that there are a plurality of air-conditioning apparatuses Mi (i is an integer from 1 to N, where N is the number of air-conditioning apparatuses for which rotation is to be performed, and is equal to 8 in the example of Table 5), the air-conditioning apparatuses M1 to M4 are supplied with a heat medium from the heat source apparatus 1, and the air-conditioning apparatuses M5 to M8 are supplied with a heat medium from the heat source apparatus 2.

TABLE 5

| Apparatus | Power Consumption [kW] | Connected Heat Source |
|---|---|---|
| M1 | 140 | 1 |
| M2 | 70 | 1 |
| M3 | 30 | 1 |
| M4 | 20 | 1 |
| M5 | 70 | 2 |
| M6 | 30 | 2 |
| M7 | 20 | 2 |
| M8 | 10 | 2 |

That is, the attribute H of each of the air-conditioning apparatuses M1 to M4 is equal to 1, and the attribute H of each of the air-conditioning apparatuses M5 to M8 is equal to 2. Rotation groups of the air-conditioning apparatuses M are determined for each value of the attribute H by applying the basic rule in descending order of the required power consumption values of the air-conditioning apparatuses M. Here, the magnitude relationship between total power consumption values need not be precisely determined, and the order of total power consumption values that differ within a margin of error may be interchanged in accordance with a target level of electric power smoothing.

The group determination unit 121 rearranges (sorts) the air-conditioning apparatuses M1 to M4 that are supplied with a heat medium from the heat source apparatus 1 and that have the attribute H equal to 1 in descending order of the required power consumption values (step S100 in FIG. 2). As values indicating the required power consumption values, the power consumption values or the like of the air-conditioning apparatuses M1 to M4 obtained by the power consumption obtaining unit 13 are used.

Subsequently, the group determination unit 121 applies the above-described basic rule to the air-conditioning apparatuses M1 to M4 having the attribute H equal to 1 in the order determined as a result of rearrangement in step S100 and classifies each of the air-conditioning apparatuses M1 to M4 into a rotation group R1 or a rotation group R2 (step S101 in FIG. 2).

In the example of Table 5, the basic rule is applied to the air-conditioning apparatuses M1 to M4 in the order of M1, M2, M3, and M4. Initially, neither the rotation group R1 nor the rotation group R2 includes an air-conditioning apparatus having the attribute H equal to 1, and therefore, the air-conditioning apparatus M1 is classified into the rotation group R1, which has a smaller number. The air-conditioning apparatus M2 is classified into the rotation group R2 in which the total power consumption of air-conditioning apparatuses having the attribute H equal to 1 is zero.

Next, the total power consumption of air-conditioning apparatuses having the attribute H equal to 1 included in the rotation group R1 is 140 kW (the power consumption of the air-conditioning apparatus M1) while the total power consumption of air-conditioning apparatuses having the attribute H equal to 1 included in the rotation group R2 is 70 kW (the power consumption of the air-conditioning apparatus M2), which is smaller than that of the rotation group R1, and therefore, the air-conditioning apparatus M3 is classified into the rotation group R2.

Similarly, the total power consumption of air-conditioning apparatuses having the attribute H equal to 1 included in the rotation group R1 is 140 kW while the total power consumption of air-conditioning apparatuses having the attribute H equal to 1 included in the rotation group R2 is 100 kW (the sum of the power consumption values of the air-conditioning apparatuses M2 and M3), which is smaller than that of the rotation group R1, and therefore, the air-conditioning apparatus M4 is classified into the rotation group R2. As a result, the air-conditioning apparatuses M1 to M4 are classified as illustrated in Table 6.

TABLE 6

| Group R1 | Group R2 |
|---|---|
| M1 (Power Consumption: 140 kW) | M2 (Power Consumption: 70 kW) |
| | M3 (Power Consumption: 30 kW) |
| | M4 (Power Consumption: 20 kW) |

Next, the group determination unit 121 rearranges the air-conditioning apparatuses M5 to M8 that are supplied with a heat medium from the heat source apparatus 2 and that have the attribute H equal to 2 in descending order of the required power consumption values (step S102 in FIG. 2). As values indicating the required power consumption values, the power consumption values or the like of the air-conditioning apparatuses M5 to M8 obtained by the power consumption obtaining unit 13 are used.

Subsequently, the group determination unit 121 applies the above-described basic rule to the air-conditioning apparatuses M5 to M8 having the attribute H equal to 2 in the order determined as a result of rearrangement in step S102 and classifies each of the air-conditioning apparatuses M5 to M8 into the rotation group R1 or the rotation group R2 (step S103 in FIG. 2).

In the example of Table 5, the basic rule is applied to the air-conditioning apparatuses M5 to M8 in the order of M5, M6, M7, and M8. Initially, neither the rotation group R1 nor the rotation group R2 includes an air-conditioning apparatus having the attribute H equal to 2, and therefore, the air-conditioning apparatus M5 is classified into the rotation group R1, which has a smaller number. The air-conditioning apparatus M6 is classified into the rotation group R2 in which the total power consumption of air-conditioning apparatuses having the attribute H equal to 2 is zero.

Next, the total power consumption of air-conditioning apparatuses having the attribute H equal to 2 included in the rotation group R1 is 70 kW (the power consumption of the air-conditioning apparatus M5) while the total power consumption of air-conditioning apparatuses having the attribute H equal to 2 included in the rotation group R2 is 30 kW (the power consumption of the air-conditioning apparatus M6), which is smaller than that of the rotation group R1, and therefore, the air-conditioning apparatus M7 is classified into the rotation group R2.

Similarly, the total power consumption of air-conditioning apparatuses having the attribute H equal to 2 included in the rotation group R1 is 70 kW while the total power consumption of air-conditioning apparatuses having the attribute H equal to 2 included in the rotation group R2 is 50 kW (the sum of the power consumption values of the air-conditioning apparatuses M6 and M7), which is smaller than that of the rotation group R1, and therefore, the air-conditioning apparatus M8 is classified into the rotation group R2. As a result, the air-conditioning apparatuses M5 to M8 are classified as illustrated in Table 7.

TABLE 7

| Group R1 | Group R2 |
|---|---|
| M5 (Power Consumption: 70 kW) | M6 (Power Consumption: 30 kW) |
| | M7 (Power Consumption: 20 kW) |
| | M8 (Power Consumption: 10 kW) |

In doing so, grouping of the target air-conditioning apparatuses M1 to M8 registered in the grouping target apparatus storage unit 110 is completed. Then, the group determination unit 121 records to the group storage unit 122 grouping information indicating the rotation groups to which the air-conditioning apparatuses M1 to M8 belong (step S104 in FIG. 2). The final result of classification of the air-conditioning apparatuses M1 to M8 is as illustrated in Table 8. In a case where the attribute H can have a value equal to or larger than 3, the process in steps S100 and S101 (S102 and S103) is also performed for each attribute value.

TABLE 8

| Group R1 | Group R2 |
|---|---|
| M1 (Power Consumption: 140 kW, H = 1) | M2 (Power Consumption: 70 kW, H = 1) |
| M5 (Power Consumption: 70 kW, H = 2) | M3 (Power Consumption: 30 kW, H = 1) |
| | M4 (Power Consumption: 20 kW, H = 1) |
| | M6 (Power Consumption: 30 kW, H = 2) |
| | M7 (Power Consumption: 20 kW, H = 2) |
| | M8 (Power Consumption: 10 kW, H = 2) |

The control device 20, which is a building energy management system (BEMS) or an air-conditioning operation management controller, for example, uses the grouping information stored in the group storage unit 122 and gives instructions to the air-conditioning apparatuses M1 to M8 so that an operation in which the rotation groups R1 and R2 enter an energy saving mode in turn is cyclically repeated.

Figure 3:
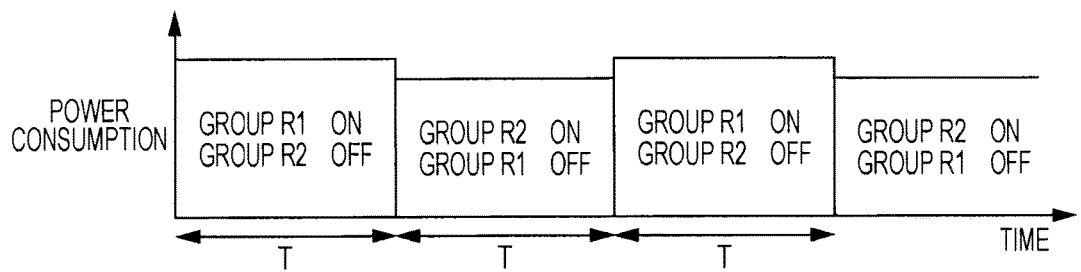
FIG. 3 is a diagram for describing fluctuating air-conditioning control according to the first embodiment of the present invention.

That is, as illustrated in FIG. 3, in a cycle T, the air-conditioning apparatuses M1 and M5 in the rotation group R1 enter a normal operation mode (ON), and the air-conditioning apparatuses M2 to M4 and M6 to M8 in the rotation group R2 enter an energy saving mode (OFF). In the next cycle T, the air-conditioning apparatuses M2 to M4 and M6 to M8 in the rotation group R2 enter the normal operation mode (ON), and the air-conditioning apparatuses M1 and M5 in the rotation group R1 enter the energy saving mode (OFF). Such cyclic control is repeatedly performed.

As a result of fluctuating air-conditioning control, in the example of grouping illustrated in Table 8, the ratio of the total power consumption of air-conditioning apparatuses having the attribute H equal to 1 included in the rotation group R1 to the total power consumption of air-conditioning apparatuses having the attribute H equal to 1 included in the rotation group R2 is 140 to 120, and the ratio of the total power consumption of air-conditioning apparatuses having the attribute H equal to 2 included in the rotation group R1 to the total power consumption of air-conditioning apparatuses having the attribute H equal to 2 included in the rotation group R2 is 70 to 60. The ratio of the total power consumption of all air-conditioning apparatuses included in the rotation group R1 to the total power consumption of all air-conditioning apparatuses included in the rotation group R2 is 210 to 180.

As described above, according to this embodiment, it is possible to reduce, between the rotation groups, the difference in the total power consumption of air-conditioning apparatuses having the same attribute and to also reduce, between the rotation groups, the difference in the total power consumption in terms of overall power consumption for all attributes.

Here, as a comparative example, it is assumed that the air-conditioning apparatuses K1 to K8 illustrated in Table 1 are connected to heat source apparatuses as illustrated in Table 9.

TABLE 9

| Apparatus | Power Consumption [kW] | Connected Heat Source |
| --- | --- | --- |
| K1 | 140 | 1 |
| K2 | 70 | 2 |
| K3 | 70 | 1 |
| K4 | 30 | 2 |
| K5 | 30 | 1 |
| K6 | 20 | 2 |
| K7 | 20 | 1 |
| K8 | 10 | 2 |

In the example of Table 9, the air-conditioning apparatuses K1, K3, K5, and K7 are supplied with a heat medium from the heat source apparatus 1, and the air-conditioning apparatuses K2, K4, K6, and K8 are supplied with a heat medium from the heat source apparatus 2. That is, if this is rephrased in accordance with the method of this embodiment, the air-conditioning apparatuses K1, K3, K5, and K7 each have the attribute H equal to 1, and the air-conditioning apparatuses K2, K4, K6, and K8 each have the attribute H equal to 2. Tables 10 and 11 are tables obtained by adding information about the attribute H to Tables 3 and 4.

TABLE 10

| Group 1 | Group 2 |
| --- | --- |
| K2 (Power Consumption: 70 kW, H = 2) | K3 (Power Consumption: 70 kW, H = 1) |
| K4 (Power Consumption: 30 kW, H = 2) | K5 (Power Consumption: 30 kW, H = 1) |
| K6 (Power Consumption: 20 kW, H = 2) | K7 (Power Consumption: 20 kW, H = 1) |
| K8 (Power Consumption: 10 kW, H = 2) | K1 (Power Consumption: 140 kW, H = 1) |

TABLE 11

| Group 1 | Group 2 |
| --- | --- |
| K2 (Power Consumption: 70 kW, H = 2) | K3 (Power Consumption: 70 kW, H = 1) |
| K4 (Power Consumption: 30 kW, H = 2) | K5 (Power Consumption: 30 kW, H = 1) |
| K6 (Power Consumption: 20 kW, H = 2) | K7 (Power Consumption: 20 kW, H = 1) |
| K1 (Power Consumption: 140 kW H = 1) | K8 (Power Consumption: 10 kW, H = 2) |

In the example of Table 10, the ratio of the total power consumption of all air-conditioning apparatuses included in group 1 to the total power consumption of all air-conditioning apparatuses included in group 2 is 130 to 260. However, the ratio of the total power consumption of air-conditioning apparatuses having the attribute H equal to 1 included in group 1 to the total power consumption of air-conditioning apparatuses having the attribute H equal to 1 included in group 2 is 0 to 260, and the ratio of the total power consumption of air-conditioning apparatuses having the attribute H equal to 2 included in group 1 to the total power consumption of air-conditioning apparatuses having the attribute H equal to 2 included in group 2 is 130 to 0, which shows a large imbalance in power consumption in terms of attribute H being equal to 1 and that being equal to 2.

Similarly, in the example of Table 11, the ratio of the total power consumption of all air-conditioning apparatuses included in group 1 to the total power consumption of all air-conditioning apparatuses included in group 2 is 260 to 130. However, the ratio of the total power consumption of air-conditioning apparatuses having the attribute H equal to 1 included in group 1 to the total power consumption of air-conditioning apparatuses having the attribute H equal to 1 included in group 2 is 140 to 120, and the ratio of the total power consumption of air-conditioning apparatuses having the attribute H equal to 2 included in group 1 to the total power consumption of air-conditioning apparatuses having the attribute H equal to 2 included in group 2 is 120 to 10, which shows a large imbalance in power consumption in terms of attribute H being equal to 2.

As described above, with the related art, a large imbalance is created in operation (power consumption) of air-conditioning apparatuses, and therefore, a failure event may occur where a heat source apparatus enters an excessive on/off state and inefficiently starts and stops repeatedly. In the example of Table 10, the ratio of the total power consumption of air-conditioning apparatuses having the attribute H equal to 1 included in group 1 to the total power consumption of air-conditioning apparatuses having the attribute H equal to 1 included in group 2 is 0 to 260, and therefore, the heat source apparatus 1 inefficiently starts and stops repeatedly when the air-conditioning apparatuses K1 to K8 are controlled so that groups 1 and 2 repeatedly enter an energy saving mode in turn cyclically. In a case where the attribute H corresponds to a measurement area, a failure event may occur where a certain tenant facility enters an excessive on/off state and high peak usage of electric power occurs, resulting in an increase in the electricity price.

On the other hand, in this embodiment, it is possible to reduce, between the rotation groups, the difference in the total power consumption of air-conditioning apparatuses having the same attribute (heat source apparatus or measurement area) as described above and to reduce failure events.

Second Embodiment

Next, a second embodiment of the present invention will be described. Also in this embodiment, the configuration of the air-conditioning control system is similar to that in the first embodiment, and therefore, the reference numerals in FIG. 1 are used in description. In this embodiment, a rotation group that is determined for each value of the attribute H as described in the first embodiment is referred to as an attribute-basis rotation group $Rp(H)$ (p is a rotation group number equal to or smaller than the number of rotation groups Q), and a final rotation group $Rp$ obtained by combining together attribute-basis rotation groups is determined to thereby increase the possibility of further reducing, between the rotation groups, the difference in the total power consumption in terms of overall power consumption for all attributes.

Figure 4:
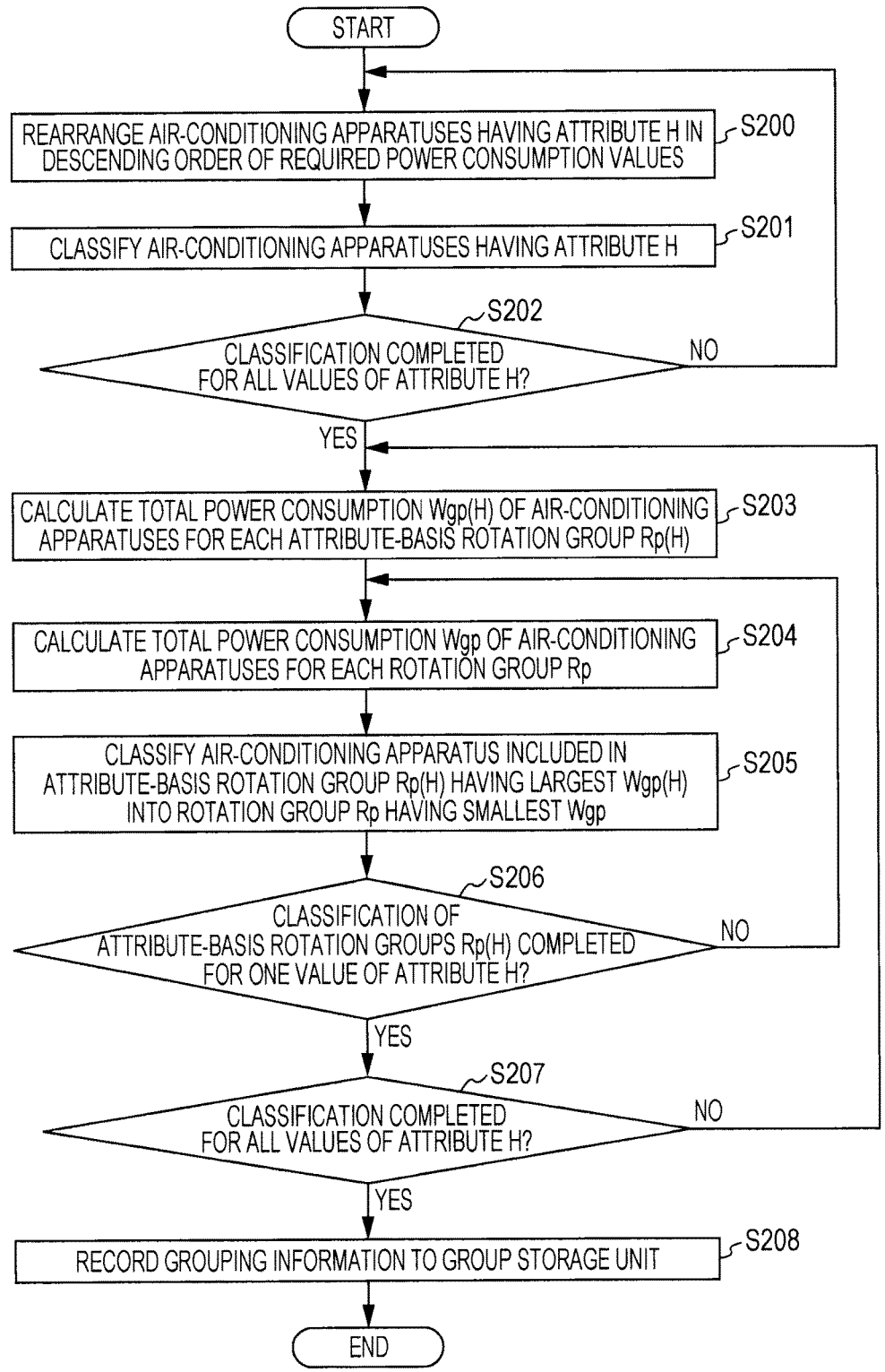
FIG. 4 is a flowchart illustrating an operation of the group determination unit of the apparatus operation group determination device according to a second embodiment of the present invention.

FIG. 4 is a flowchart illustrating an operation of the group determination unit 121 according to this embodiment. The process in steps S200 and S201 in FIG. 4 is as described in the first embodiment. That is, the group determination unit 121 rearranges air-conditioning apparatuses M each having the attribute H in descending order of the required power consumption values (step S200 in FIG. 4), applies the basic rule to the air-conditioning apparatuses M in the order determined as a result of rearrangement, and groups the air-conditioning apparatuses M (step S201 in FIG. 4). The group determination unit 121 performs the process in steps S200 and S201 for each value of the attribute H until classification is completed for all values of the attribute H (Yes in step S202 in FIG. 4).

Next, the group determination unit 121 assumes the rotation group that is determined for each value of the attribute H in the process in steps S200 to S202 to be an attribute-basis rotation group Rp(H) and performs the following process.

The group determination unit 121 calculates the total power consumption Wgp(H) of air-conditioning apparatuses M for each attribute-basis rotation group Rp(H) (step S203 in FIG. 4).

The group determination unit 121 calculates the total power consumption Wgp of air-conditioning apparatuses M for each rotation group Rp (step S204 in FIG. 4).

The group determination unit 121 classifies, into a rotation group Rp having the smallest total power consumption Wgp, any air-conditioning apparatus M that is included in an attribute-basis rotation group Rp(H) having the largest total power consumption Wgp(H) among attribute-basis rotation groups Rp(H) for which classification is not completed (step S205 in FIG. 4).

The group determination unit 121 performs the process in steps S204 and S205 for each attribute-basis rotation group Rp(H) (for each rotation group number p) until classification of all attribute-basis rotation groups Rp(H) is completed for one value of the attribute H (Yes in step S206 in FIG. 4).

The group determination unit 121 performs the process in steps S203 to S206 for each value of the attribute H until classification for all values of the attribute H is completed (Yes in step S207 in FIG. 4).

As a result, classification of all attribute-basis rotation groups Rp(H) into rotation groups Rp is completed. Then, the group determination unit 121 records to the group storage unit 122 grouping information indicating the rotation groups Rp to which the air-conditioning apparatuses M belong (step S208 in FIG. 4).

Operations of other constituent elements are as described in the first embodiment. Note that when a first attribute-basis rotation group Rp(H) is to be grouped in the process in step S205, all rotation groups Rp are empty, and therefore, the first attribute-basis rotation group Rp(H) may be classified into any rotation group Rp.

In the process in step S205, in a case where there are a plurality of rotation groups Rp having the smallest total power consumption Wgp, the attribute-basis rotation group Rp(H) may be put in any of the rotation groups Rp. In this embodiment, all air-conditioning apparatuses M included in the attribute-basis rotation group Rp(H) may be classified into a rotation group Rp having the smallest rotation group number p among the plurality of rotation groups Rp having the smallest total power consumption Wgp, for example.

In the process in step S205, in a case where there are a plurality of attribute-basis rotation groups Rp(H) having the largest total power consumption Wgp(H), these attribute-basis rotation groups Rp(H) may be processed in the order of rotation group number p, for example.

When this embodiment is applied to the examples of Tables 5 to 8, the number of rotation groups Q is equal to 2, and the attribute H can have a value of 2 as a maximum value G. The air-conditioning apparatus M1 having the attribute H equal to 1 is classified into an attribute-basis rotation group R1(1), and the total power consumption Wg1(1) of the attribute-basis rotation group R1(1) that includes the air-conditioning apparatus M1 is 140 kW. The air-conditioning apparatuses M2 to M4 each having the attribute H equal to 1 are classified into an attribute-basis rotation group R2(1), and the total power consumption Wg2(1) of the air-conditioning apparatuses M2 to M4 that are included in the attribute-basis rotation group R2(1) is 120 kW.

The air-conditioning apparatus M5 having the attribute H equal to 2 is classified into an attribute-basis rotation group R1(2), and the total power consumption Wg1(2) of the attribute-basis rotation group R1(2) that includes the air-conditioning apparatus M5 is 70 kW. The air-conditioning apparatuses M6 to M8 each having the attribute H equal to 2 are classified into an attribute-basis rotation group R2(2), and the total power consumption Wg2(2) of the air-conditioning apparatuses M6 to M8 that are included in the attribute-basis rotation group R2(2) is 60 kW. These attribute-basis rotation groups R1(1), R2(1), R1(2), and R2(2) are each sorted into the rotation group R1 or R2 for each value of the attribute H.

First, for the attribute H equal to 1, the group determination unit 121 calculates, for each of the attribute-basis rotation groups Rp(1) (p=1, 2), the total power consumption Wgp(1) of the air-conditioning apparatuses M (step S203). Here, Wg1(1) is equal to 140, and Wg2(1) is equal to 120, as described above.

The group determination unit 121 calculates, for each of the rotation groups Rp (p=1, 2), the total power consumption Wgp of the air-conditioning apparatuses M (step S204). No air-conditioning apparatus M is included in the rotation groups, and therefore, both Wg1 and Wg2 are equal to zero.

The group determination unit 121 classifies all air-conditioning apparatuses M included in the attribute-basis rotation group R1(1) having the largest total power consumption Wgp(1) into a rotation group Rp having the smallest total power consumption Wgp (step S205). Here, both Wg1 and Wg2 are equal to zero, and therefore, the air-conditioning apparatus M1 included in the attribute-basis rotation group R1(1) is classified into the rotation group R1 having the smallest rotation group number p.

Next, the group determination unit 121 calculates again, for each of the rotation groups Rp (p=1, 2), the total power consumption Wgp of the air-conditioning apparatuses M (step S204). As a result of the process in step S205 performed immediately before this step, Wg1 is equal to 140, and Wg2 is equal to zero.

The group determination unit 121 classifies the air-conditioning apparatuses M2 to M4 included in the remaining attribute-basis rotation group R2(1) for which classification is not completed into the rotation group R2 having the smallest total power consumption Wgp among the rotation groups Rp (p=1, 2) (step S205 in FIG. 4). Consequently, classification for the attribute H equal to 1 is completed. The result of classification performed so far is as indicated in Table 6.

Next, for the attribute H equal to 2, the group determination unit 121 calculates, for each of the attribute-basis rotation groups Rp(2) (p=1, 2), the total power consumption Wgp(2) of the air-conditioning apparatuses M (step S203). Here, Wg1 (2) is equal to 70, and Wg2(2) is equal to 60, as described above.

The group determination unit 121 calculates, for each of the rotation groups Rp (p=1, 2), the total power consumption Wgp of the air-conditioning apparatuses M (step S204). As a result of the process in step S205 performed last, Wg1 is equal to 140, and Wg2 is equal to 120.

Subsequently, the group determination unit 121 classifies the air-conditioning apparatus M5 that is included in the attribute-basis rotation group R1(2) having the largest total power consumption Wgp(2) among the attribute-basis rotation groups Rp(2) (p=1, 2) for which classification is not completed into the rotation group R2 having the smallest total power consumption Wgp among the rotation groups Rp (p=1, 2) (step S205).

Next, the group determination unit 121 calculates again, for each of the rotation groups Rp (p=1, 2), the total power consumption Wgp of the air-conditioning apparatuses M (step S204). As a result of the process in step S205 performed immediately before this step, Wg1 is equal to 140, and Wg2 is equal to 190.

The group determination unit 121 classifies the air-conditioning apparatuses M6 to M8 included in the remaining attribute-basis rotation group R2(2) for which classification is not completed into the rotation group R1 having the smallest total power consumption Wgp among the rotation groups Rp (p=1, 2) (step S205). Consequently, classification for the attribute H equal to 2 is completed. As a result, the air-conditioning apparatuses M1 to M8 are classified as indicated in Table 12.

TABLE 12

| Group R1 | Group R2 |
|---|---|
| M1 (Power Consumption: 140 kW, H = 1) | M2 (Power Consumption: 70 kW, H = 1) |
| M6 (Power Consumption: 30 kW, H = 2) | M3 (Power Consumption: 30 kW, H = 1) |
| M7 (Power Consumption: 20 kW, H = 2) | M4 (Power Consumption: 20 kW, H = 1) |
| M8 (Power Consumption: 10 kW, H = 2) | M5 (Power Consumption: 70 kW, H = 2) |

In both Table 8 that indicates the result of classification according to the first embodiment and Table 12 that indicates the result of classification according to this embodiment, the ratio of the total power consumption of air-conditioning apparatuses having the attribute H equal to 1 included in the rotation group R1 to the total power consumption of air-conditioning apparatuses having the attribute H equal to 1 included in the rotation group R2 is 140 to 120. That is, the ratio is the same in Tables 8 and 12.

In Table 8, the ratio of the total power consumption of air-conditioning apparatuses having the attribute H equal to 2 included in the rotation group R1 to the total power consumption of air-conditioning apparatuses having the attribute H equal to 2 included in the rotation group R2 is 70 to 60. In Table 12, the ratio of the total power consumption of air-conditioning apparatuses having the attribute H equal to 2 included in the rotation group R1 to the total power consumption of air-conditioning apparatuses having the attribute H equal to 2 included in the rotation group R2 is 60 to 70. That is, although the magnitude of the total power consumption of each rotation group in Table 8 differs from that in Table 12, the ratio between the total power consumption values in Table 8 is the same as that in Table 12.

On the other hand, the ratio of the total power consumption of all air-conditioning apparatuses included in the rotation group R1 to the total power consumption of all air-conditioning apparatuses included in the rotation group R2 is 210 to 180 in Table 8 while the ratio of the total power consumption of all air-conditioning apparatuses included in the rotation group R1 to the total power consumption of all air-conditioning apparatuses included in the rotation group R2 is 200 to 190 in Table 12. That is, it is found that the difference in the total power consumption between the rotation groups is reduced in terms of overall power consumption for all attributes.

Figure 5:
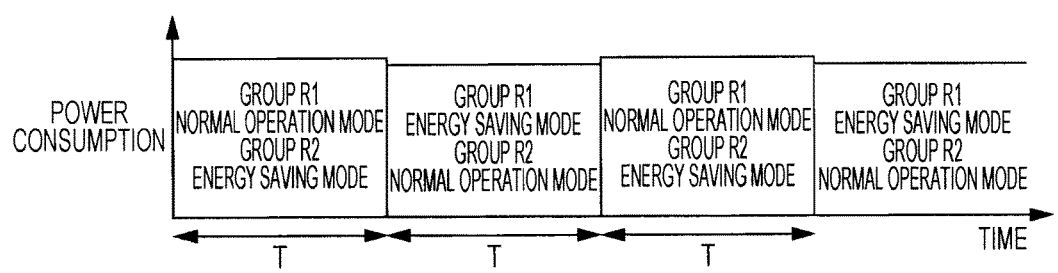
FIG. 5 is a diagram for describing another example of fluctuating air-conditioning control.
Figure 6:
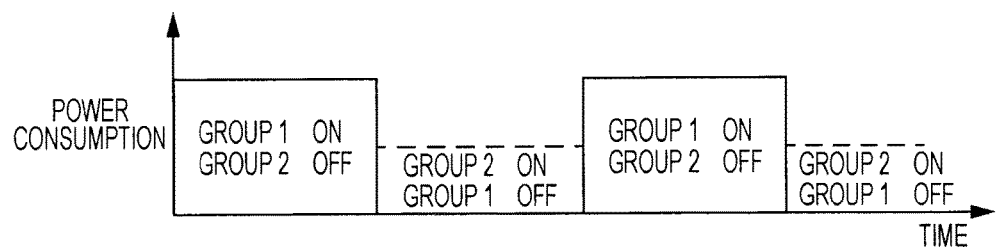
FIG. 6 is a diagram illustrating an example of changes in power consumption during operation when fluctuating air-conditioning control is performed.

In the first and second embodiments, as an example of fluctuating air-conditioning control, the case has been described where air-conditioning apparatuses are cyclically turned on and off; however, fluctuation air-conditioning control is not limited to this. For example, room temperature settings SP may be cyclically changed. In this case, in the example of the first embodiment, the air-conditioning apparatuses M1 and M5 in the rotation group R1 enter a normal operation mode and the air-conditioning apparatuses M2 to M4 and M6 to M8 in the rotation group R2 enter an energy saving mode in a cycle T, and the air-conditioning apparatuses M2 to M4 and M6 to M8 in the rotation group R2 enter the normal operation mode and the air-conditioning apparatuses M1 and M5 in the rotation group R1 enter the energy saving mode in the next cycle T, as illustrated in FIG. 5. Such cyclic control is repeatedly performed.

In the energy saving mode in a case of cooling, the control device 20 changes room temperature settings by adding a predetermined value to the room temperature settings SP. As a result, the power consumption of air-conditioning apparatuses can be reduced; however, the cooling capacity is limited compared to the normal operation mode.

On the other hand, in the energy saving mode in a case of heating, the control device 20 changes room temperature settings by subtracting a predetermined value from the room temperature settings SP. As a result, the power consumption of air-conditioning apparatuses can be reduced; however, the heating capacity is limited compared to the normal operation mode.

In doing so, fluctuating air-conditioning control in which the room temperature settings SP are cyclically changed can be implemented. As a matter of course, each air-conditioning apparatus operates so that the room temperature of the target air-conditioning zone matches the room temperature setting SP.

Each of the apparatus operation group determination device 10 and the control device 20 described in the first and second embodiments can be implemented by using a computer that includes a central processing unit (CPU), a storage device, and an interface, and a program that controls these hardware resources, for example. The CPU of each device performs the processes described in the first and second embodiments in accordance with the program stored in the storage device.

The present invention is applicable to fluctuating air-conditioning control for cyclically repeating an operation in which a plurality of rotation groups enter an energy saving mode in turn.

What is claimed is:
1. An air-conditioning control system for performing fluctuating air-conditioning control for cyclically repeating an operation in which a plurality of rotation groups enter an energy saving mode in turn, the air-conditioning control system comprising:
- a hardware storage device that stores, in advance, information about a plurality of air-conditioning apparatuses, which are rotation group setting targets, an attribute of each of the air-conditioning apparatuses, a group setting rule for reducing, between the rotation groups, a difference in total power consumption of air-conditioning apparatuses having an identical attribute, and grouping information indicating the rotation groups to which the air-conditioning apparatuses belong;
- first processing circuitry configured to
  - obtain information about power consumption values of the air-conditioning apparatuses for which the information is stored in the hardware storage device, and
  - determine rotation groups to which the air-conditioning apparatuses belong in accordance with the power consumption values of the air-conditioning apparatuses obtained by the first processing circuitry and the group setting rule; and
- a control device including second processing circuitry is configured to give instructions to the air-conditioning apparatuses for cyclically repeating an operation in which the plurality of rotation groups enter the energy saving mode in turn in accordance with the stored grouping information, wherein
- the group setting rule used by the first processing circuitry is a rule in which a process of comparing total power consumption values of the rotation groups, each of the total power consumption values of the rotation groups being a total power consumption value of air-conditioning apparatuses classified into each of the rotation groups, with each other for each attribute and classifying an air-conditioning apparatus into a rotation group having the smallest total power consumption value is performed for each attribute until rotation groups of all of the air-conditioning apparatuses that are grouping targets are determined.

2. The air-conditioning control system according to claim 1, wherein
the first processing circuitry is further configured to perform, for each attribute, a process of determining the rotation groups of the air-conditioning apparatuses by applying the group setting rule to the air-conditioning apparatuses in descending order of required power consumption values of the air-conditioning apparatuses.

3. The air-conditioning control system according to claim 1, wherein
when a value of the attribute is denoted by H, a rotation group determined for each attribute value H in accordance with the group setting rule is referred to as an attribute-basis rotation group Rp(H), a rotation group that is finally determined is denoted by Rp, total power consumption of air-conditioning apparatuses included in an attribute-basis rotation group Rp(H) is denoted by Wgp(H), and a total power consumption of air-conditioning apparatuses included in a rotation group Rp is denoted by Wgp,
the first processing circuitry is further configured to perform, for each attribute value H, a process of classifying an air-conditioning apparatus that is included in an attribute-basis rotation group Rp(H) having the largest total power consumption Wgp(H) among attribute-basis rotation groups Rp(H) for which classification into rotation groups Rp is not completed into a rotation group Rp having the smallest total power consumption Wgp.

4. An air-conditioning control method for performing fluctuating air-conditioning control for cyclically repeating an operation in which a plurality of rotation groups enter an energy saving mode in turn, the air-conditioning control method comprising:
- referring to a hardware storage device that stores in advance information about a plurality of air-conditioning apparatuses which are rotation group setting targets, and obtaining power consumption values of the air-conditioning apparatuses for which the information is stored in the hardware storage device;
- a group determination step of referring to the hardware storage device, that stores in advance an attribute of each of the air-conditioning apparatuses, and a group setting rule for reducing, between the rotation groups, a difference in total power consumption of air-conditioning apparatuses having an identical attribute, and determining rotation groups to which the air-conditioning apparatuses belong in accordance with the obtained power consumption values of the air-conditioning apparatuses;
- recording, to the hardware storage device, grouping information indicating the rotation groups to which the air-conditioning apparatuses belong; and
- giving instructions to the air-conditioning apparatuses for cyclically repeating an operation in which the plurality of rotation groups enter the energy saving mode in turn in accordance with the stored grouping information,
- wherein the group setting rule is a rule in which a process of comparing total power consumption values of the rotation groups, each of the total power consumption values of the rotation groups being a total power consumption value of air-conditioning apparatuses classified into each of the rotation groups, with each other for each attribute and classifying an air-conditioning apparatus into a rotation group having the smallest total power consumption value is performed for each attribute until rotation groups of all of the air-conditioning apparatuses that are grouping targets are determined.

5. The air-conditioning control method according to claim 4, wherein
the group determination step includes a step of performing, for each attribute, a process of determining the rotation groups of the air-conditioning apparatuses by applying the group setting vile to the air-conditioning apparatuses in descending order of required power consumption values of the air-conditioning apparatuses.

6. The air-conditioning control method according to claim 4, wherein
when a value of the attribute is denoted by H, a rotation group determined for each attribute value H in accordance with the group setting rule is referred to as an attribute-basis rotation group Rp(H), a rotation group that is finally determined is denoted by Rp, total power consumption of air-conditioning apparatuses included in an attribute-basis rotation group Rp(H) is denoted by Wgp(H), and a total power consumption of air-conditioning apparatuses included in a rotation group Rp is denoted by Wgp,
the group determination step further includes a step of performing, for each attribute value H, a process of classifying an air-conditioning apparatus that is included in an attribute-basis rotation group Rp(H) having the largest total power consumption Wgp(H) among attribute-basis rotation groups Rp(H) for which classification into rotation groups Rp is not completed into a rotation group Rp having the smallest total power consumption Wgp.

* * * * *